US012440755B2

(12) United States Patent
Hsu et al.

(10) Patent No.: US 12,440,755 B2
(45) Date of Patent: Oct. 14, 2025

(54) SHOOTING GAME DEVICE HAVING LOCKING FUNCTION, AND METHOD FOR IMPLEMENTING LOCKING FUNCTION THEREOF

(71) Applicant: Tien-Shu Hsu, Taichung (TW)

(72) Inventors: Shun-Tsung Hsu, Taichung (TW); Chang-Yi Wang, Taichung (TW)

(73) Assignee: Tien-Shu Hsu, Taichung (TW)

( * ) Notice: Subject to any disclaimer, the term of this patent is extended or adjusted under 35 U.S.C. 154(b) by 560 days.

(21) Appl. No.: 17/910,531

(22) PCT Filed: Apr. 26, 2020

(86) PCT No.: PCT/CN2020/087046
§ 371 (c)(1),
(2) Date: Sep. 9, 2022

(87) PCT Pub. No.: WO2021/217304
PCT Pub. Date: Nov. 4, 2021

(65) Prior Publication Data

US 2023/0166184 A1 Jun. 1, 2023

(51) Int. Cl.
*A63F 13/426* (2014.01)
*A63F 13/2145* (2014.01)
(Continued)

(52) U.S. Cl.
CPC ........ *A63F 13/426* (2014.09); *A63F 13/2145* (2014.09); *A63F 13/5372* (2014.09); *A63F 13/837* (2014.09); *A63F 13/90* (2014.09)

(58) Field of Classification Search
CPC ................ A63F 13/426; A63F 13/2145; A63F 13/5327; A63F 13/837; A63F 13/26; A63F 13/843
See application file for complete search history.

(56) References Cited

U.S. PATENT DOCUMENTS 8,858,316 B2 * 10/2014 Post .................... G07F 17/3276 463/16
2014/0349730 A1 * 11/2014 Sugai .................... G07F 17/329 463/17

(Continued)

FOREIGN PATENT DOCUMENTS

CN 101282771 A 10/2008
CN 107029428 A 8/2017

(Continued)

*Primary Examiner* — James S. McClellan
(74) *Attorney, Agent, or Firm* — MUNCY, GEISSLER, OLDS & LOWE, P.C.

(57) ABSTRACT

A shooting game device having a locking function, and a method for implementing the locking function thereof. A preview unit generates, according to at least one lockable target, a corresponding preview image including at least one lock icon corresponding to the at least one lockable target. The preview unit presents the preview image on a game screen and provides same to a player. The player can switch to and select any one of the at least one lock icon via a control unit, such that a game processing unit locks a corresponding lockable target, and the player can then quickly and accurately switch to said lockable target to perform locking. The invention thus meets user requirements.

16 Claims, 11 Drawing Sheets

(51) Int. Cl.

| | |
|---|---|
| ***A63F 13/5372*** | (2014.01) |
| ***A63F 13/837*** | (2014.01) |
| ***A63F 13/90*** | (2014.01) |

(56) References Cited

U.S. PATENT DOCUMENTS

| | | | | |
|---|---|---|---|---|
| 2019/0366214 | A1* | 12/2019 | Pan | A63F 13/426 |
| 2020/0070052 | A1* | 3/2020 | Suek | A63F 13/30 |
| 2020/0193779 | A1* | 6/2020 | Metz | G07F 17/3276 |

FOREIGN PATENT DOCUMENTS

| | | | |
|---|---|---|---|
| CN | 107551537 | A | 1/2018 |
| CN | 109865282 | A | 6/2019 |
| CN | 110465076 | A | 11/2019 |
| CN | 110694268 | A | 1/2020 |

* cited by examiner

SHOOTING GAME DEVICE HAVING LOCKING FUNCTION, AND METHOD FOR IMPLEMENTING LOCKING FUNCTION THEREOF

FIELD OF THE INVENTION

The invention relates to a shooting game device, in particular to a shooting game device with a locking function and a locking method thereof.

BACKGROUND OF THE INVENTION

Shooting game is one of the popular game types, and in addition to conventional shooting, the extended types include catching fish (netting fishing), throwing stones (smashing bricks) and the like, which can allow a single person to play or a plurality of persons to play together, wherein a single person game machine can meet the requirement that the player can play freely without pressure. The multi-player game machine is more widely favored and welcomed by players due to the additional elements of competition and having fun together. For example, Chinese Patent Publication CN101282771A provides a game device that can be played together by a plurality of players.

The shooting game is played on a shooting game device, so that a player can freely select shooting directions and targets by operating an operation element, and after each shooting, there is a certain probability to hit (hit off) the target to obtain scores. In a shooting game, a player tends to shoot a large target in order to obtain a higher score, so that in order to meet the requirement of the player, the shooting game device provides a locking function, and the player can enable the locking function to perform locking shooting on the lockable target (the large target). When the locking function is used, if there are a plurality of lockable targets on the game image are available for selecting and locking, the player can operate the operation element to switch the lockable target locked. However, in actual use, it is difficult for a player to quickly and accurately switch to the lockable target to be locked, and after each time of switching and locking the lockable target, the player must re-confirm which of the new lockable targets is, which causes the player to spend time on confirmation and detract from the time of the game.

SUMMARY OF THE INVENTION

It is a primary object of the present invention to provide a shooting game device capable of enabling a player to quickly and accurately switch to a target to be locked when switching a locked target.

It is a secondary object of the present invention to disclose a locking method of a shooting game device that allows a player to quickly and accurately switch to a target to be locked.

In order to achieve the object, the invention provides a shooting game device with a locking function, which comprises a game processing unit, a display unit, a preview unit, a control unit and a shooting unit. The game processing unit provides a shooting game and generates a game image, the display unit is connected with the game processing unit and displays the game image, the preview unit is connected with the game processing unit, the preview unit is arranged corresponding to a player, the preview unit generates a preview pattern according to at least one lockable target object, the preview pattern is corresponding to the at least one lockable target object and presented on the game image, the preview pattern comprises at least one locking diagram corresponding to the at least one lockable target object, the preview unit presents the preview pattern on the game image to be provided to the player, the control unit is connected with the game processing unit, the control unit is arranged corresponding to the player, the control unit is provided for the player to switch and select any one of the at least one locking diagrams so as to enable the game processing unit to lock the lockable target object which is selected, the shooting unit is connected with the game processing unit, the shooting unit being arranged corresponding to the player, and the shooting unit allows the player to attack the lockable target object which is locked through operating the control unit.

The invention further provides a locking method, which comprises: a game carrying out step, a locking signal generation judging step, a preview pattern generation step and a locking signal existence judging step. The game carrying out step comprises the steps of providing the shooting game and generating the game image through a game processing unit, displaying the game image through the display unit, enabling the control unit to respectively generate or release a locking signal by the player to determine whether the game processing unit locks any one of the at least one lockable target object, and enabling the player to control the shooting unit through the control unit to attack the lockable target object which is locked.

The locking signal generation judging step is to judge whether the player generates the locking signal or not, if so, carrying out the next step, namely carrying out the preview pattern generation step; and if not, returning to the game carrying out step. When the locking signal appears, the preview pattern corresponding to and presented on the game image is generated according to the at least one lockable target object through the preview unit. The locking signal existence judging step judges whether the locking signal is released or not, if so, the preview unit removes the preview pattern on the game image provided to the player corresponded and releasing, and if not, returning to the preview pattern generation step.

Accordingly, the previewing unit is used for generating the preview pattern, the preview pattern comprises the at least one locking diagram corresponding to the at least one lockable target object, and the locking diagram is presented on the game image, so that the player can know all the lockable target objects, and the control unit can be used for rapidly switching and locking the desired lockable target object to meet the use requirement.

DETAILED DESCRIPTION OF THE PREFERRED EMBODIMENTS

Figure 1:
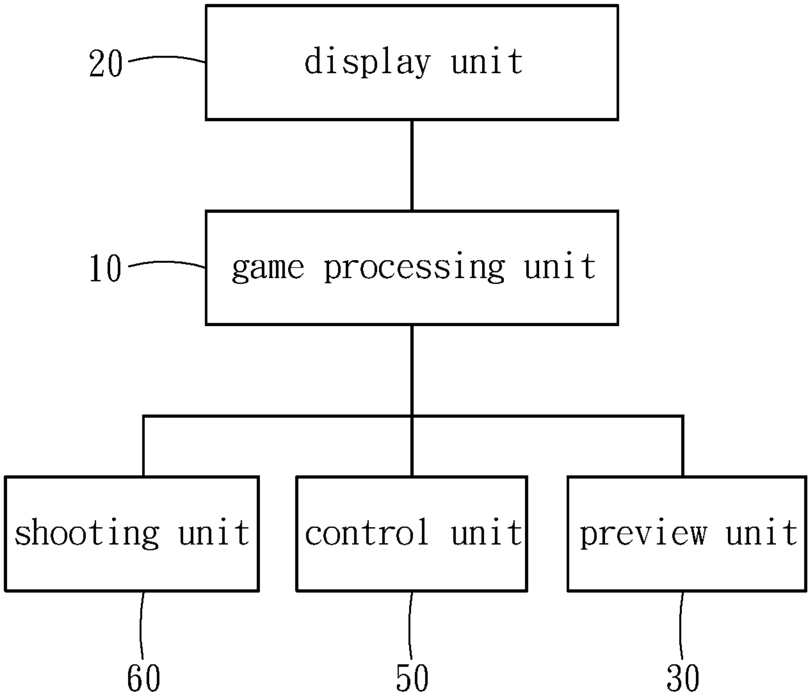
FIG. 1 is a block diagram of a system according to a first embodiment of the present invention.
Figure 2:
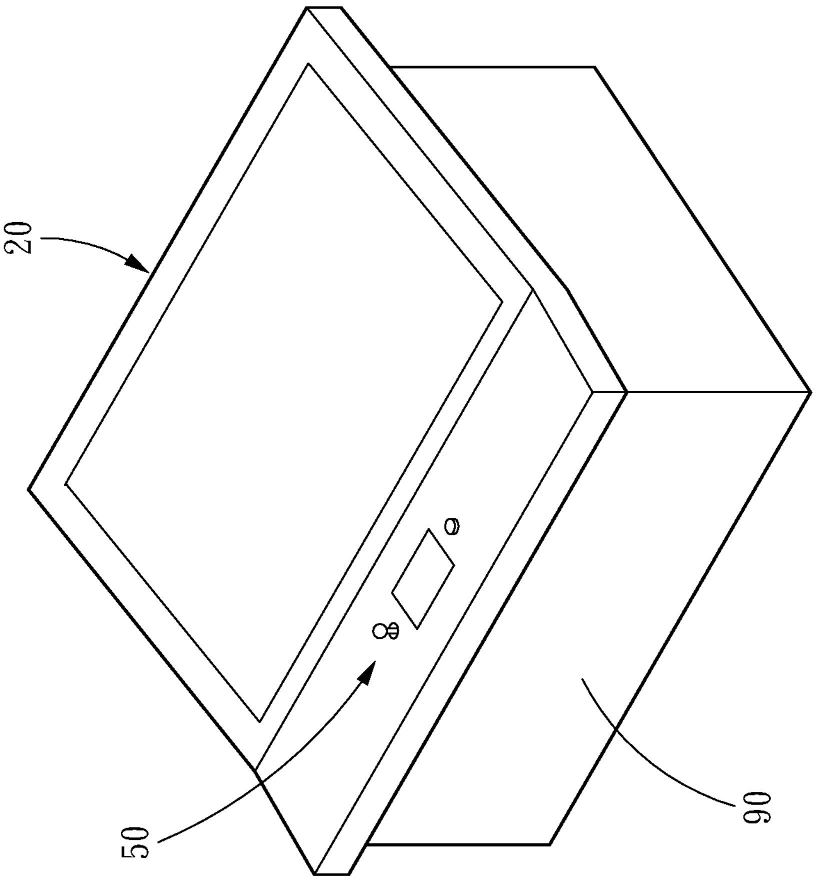
FIG. 2 is a schematic view of a game machine according to a first embodiment of the present invention.
Figure 3A:
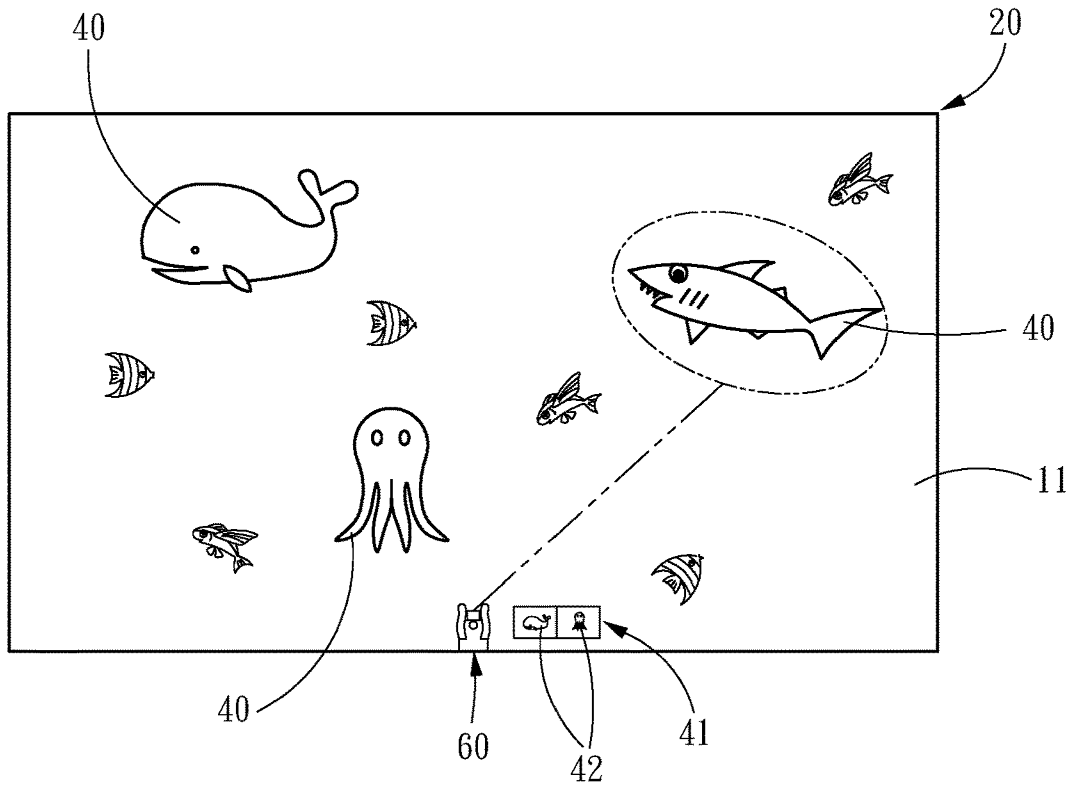
FIG. 3A is a first schematic view of a game image according to a first embodiment of the present invention.

The detailed description and technical contents of the present invention will now be described with reference to the drawings as follows:

Referring to FIGS. 1, 2 and 3A, a first embodiment of the present invention is implemented in a personal game machine 90 including a game processing unit 10, a display unit 20, a preview unit 30, a control unit 50 and a shooting unit 60. The game processing unit 10 provides a shooting game and generates a game image 11, and the display unit 20 is connected with the game processing unit 10 and displayed the game image 11.

The preview unit 30 is connected with the game processing unit 10, and the preview unit 30 is arranged corresponding to the player. The preview unit 30 generates a preview pattern 41 according to at least one of lockable target objects 40 correspondingly, the preview pattern 41 comprises at least one of locking diagrams 42 which is corresponding to the at least one of the lockable target objects 40, and the preview unit 30 presents the preview pattern 41 on the game image 11 to be provided to the player. The control unit 50 is connected with the game processing unit 10, the control unit 50 is arranged corresponding to the player, and the control unit 50 is provided for the player to switch and select at least one of the locking diagrams 42 so as to enable the game processing unit 10 to lock the lockable target object 40 which is corresponding to the at least one of the locking diagrams 42 which is selected. For example, as shown in FIG. 3A, there are three lockable target objects 40, one of the lockable target objects 40 which is circled is the currently locked target, while the other two of the lockable target objects 40 corresponding to the locking diagrams 42 (the preview pattern 41) are displayed on the game image 11. The player clearly knows the kind of the lockable target objects 40 of rank one and the lockable target objects 40 of rank two, such that when a player wants to switch the lockable target objects 40 of rank one, switching is needed only once, and when a player wants to switch the lockable target objects 40 of rank two, switching is needed only twice continuously. The player can then quickly and accurately switch to the lockable target objects 40 to be locked.

Figure 3B:
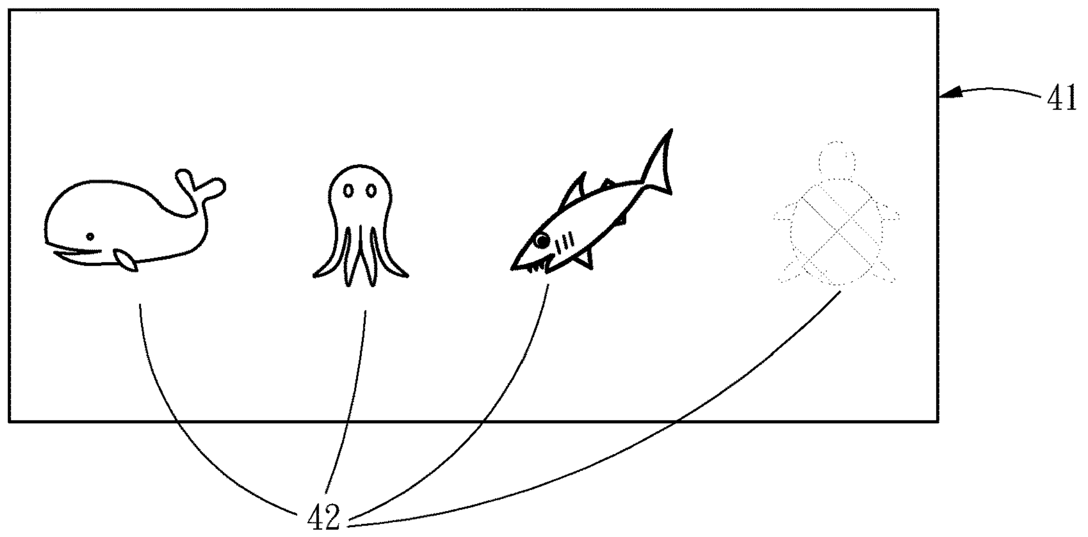
FIG. 3B is a second schematic view of a game image according to a first embodiment of the present invention.

The rank of at least one of the locking diagrams 42 in the preview pattern 41 is based on any one of random, player preferences and corresponding score, and to be designed according to preferences and requirements without limitation in any way. However, in order for the player to clearly know which of the lockable target objects 40 can be locked on the game image 11 at present, as shown in FIG. 3A, the preview unit 30 generates the preview pattern 41 according to at least one of the lockable target objects 40 appearing in the game image 11 correspondingly. Thus, all of the lockable target objects 40 corresponding to the locking diagrams 42 appearing in the preview pattern 41 are target objects can be locked. In another embodiment, the preview unit 30 further generates the preview pattern 41 according to all of the lockable target objects 40 correspondingly, wherein the locking diagram 42 corresponding to the lockable target object 40 not presented in the game image 11 in the preview pattern 41 is displayed in a gray scale, and the locking diagram 42 that is locked is displayed with bold, as shown in FIG. 3B. The lockable target objects 40 correspondingly displayed in the gray scale is an unlockable target object at present (tortoise in the drawing). The lockable target objects 40 correspondingly shown in the bold form is a currently locked target object (shark in the drawing). The remaining parts are the lockable target objects 40 that can be selected and switched to be locked (whale and octopus in the drawing), so that a player can utilize the variation of the pattern of the locking diagram 42 (normal, gray scale or bold display) to master the game status thoroughly. In addition, the shooting unit 60 is connected with the game processing unit 10, the shooting unit 60 is correspondingly arranged to the player, and the shooting unit 60 allows the player to control and attack the lockable target object 40 which is locked through the control unit 50.

Figure 4:
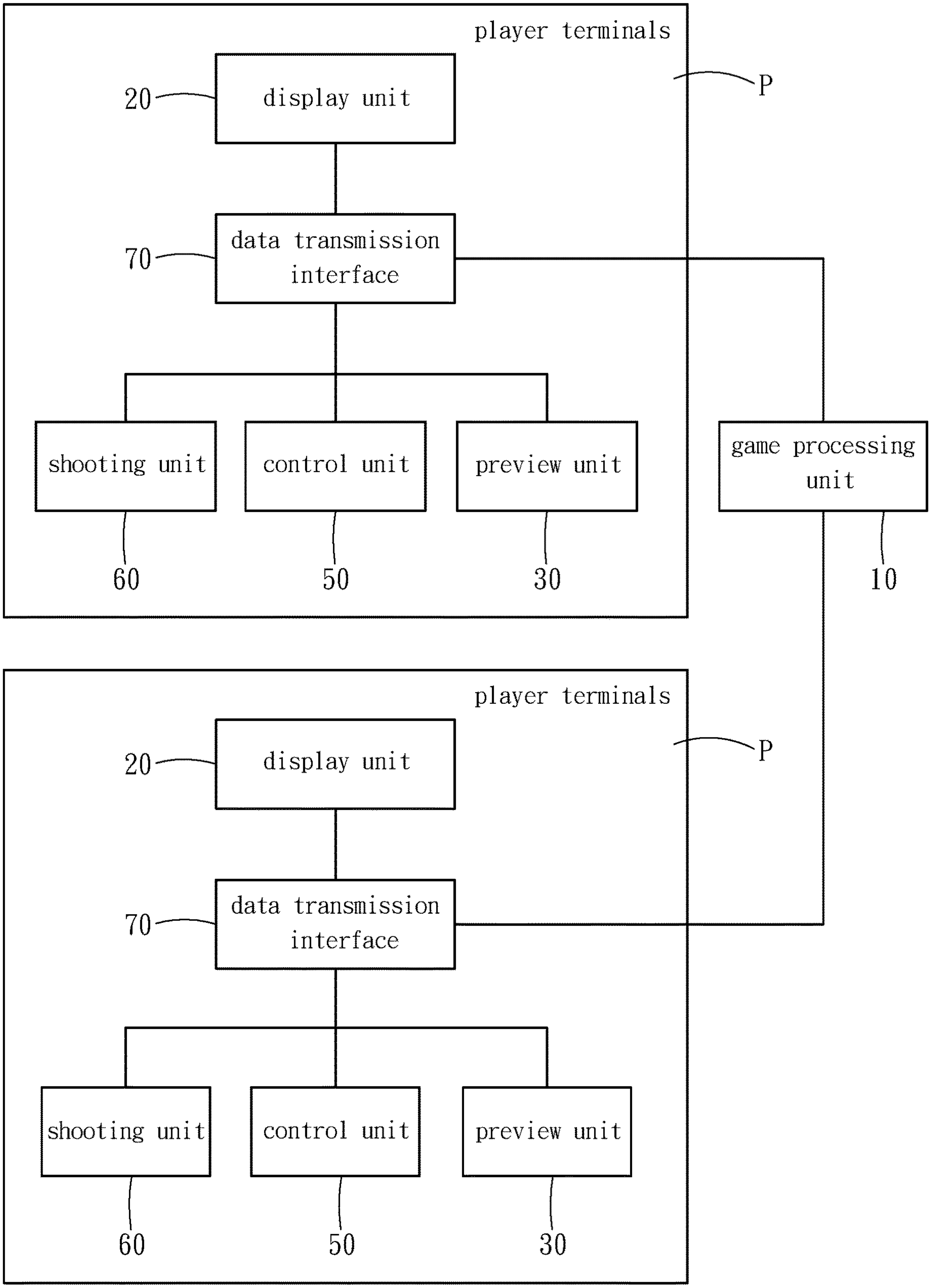
FIG. 4 is a block diagram of a system according to a second embodiment of the present invention.
Figure 5:
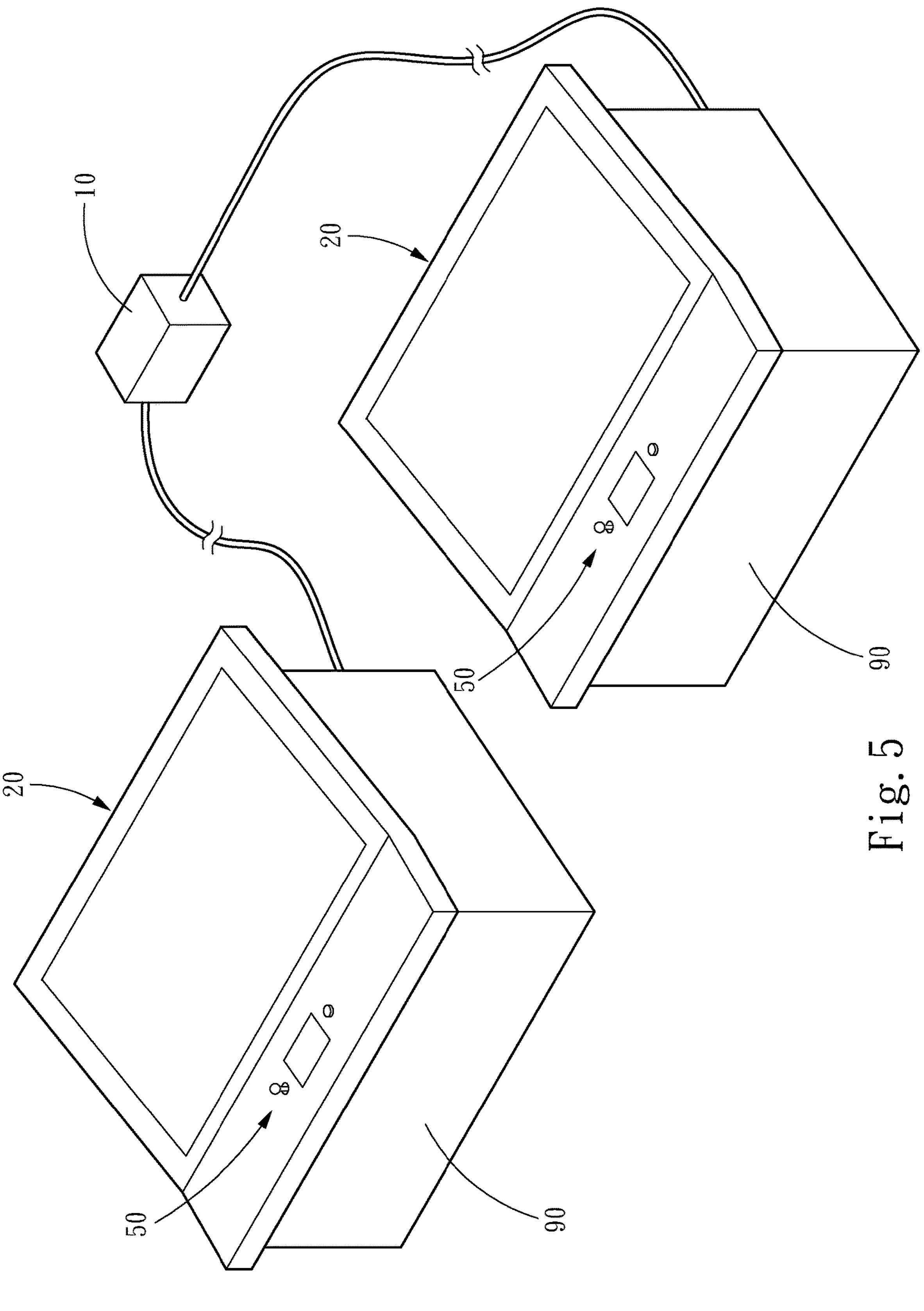
FIG. 5 is a schematic view of a game machine according to a second embodiment of the present invention.

Referring to FIGS. 4 and 5, compared with the first embodiment, a second embodiment of the present invention further includes at least two player terminals P (two player terminals P are depicted in FIG. 4), at least one additional display unit 20, at least one additional preview unit 30, at least one additional control unit 50, and at least one additional shooting unit 60. Each of the player terminals P is respectively implemented in a personal game machine 90, and each of the player terminals P is provided for a player to play, each of the player terminals P includes one of the display units 20, one of the preview units 30, one of the control units 50, one of the shooting units 60 and a data transmission interface 70. The game processing unit 10 is connected with the display unit 20, the preview unit 30, the control unit 50 and the shooting unit 60 of each of the player terminals P via the data transmission interface 70, respectively. Therefore, in the present embodiment, different player terminals P can share the game processing unit 10, thereby saving the setting cost of the game processing unit 10.

Referring again to FIG. 6, compared with the first embodiment, a third embodiment of the present invention further includes at least two player terminals P (two player terminals P are depicted in FIG. 6), at least one additional preview unit 30, at least one additional control unit 50, and at least one additional shooting unit 60, wherein each player terminal P is provided for a player to play, and each of the player terminal P includes one of the preview units 30, one of the control units 50, one of the shooting units 60 and a data transmission interface 70. The game processing unit 10 is connected with the preview unit 30, the control unit 50 and the shooting unit 60 of each of the player terminals P via the data transmission interface 70, respectively. In another embodiment, each of the player terminals P further includes a personal screen 83, the at least two personal screens 83 are also coupled to the game processing unit 10 via the data transmission interface 70.

Figure 7:
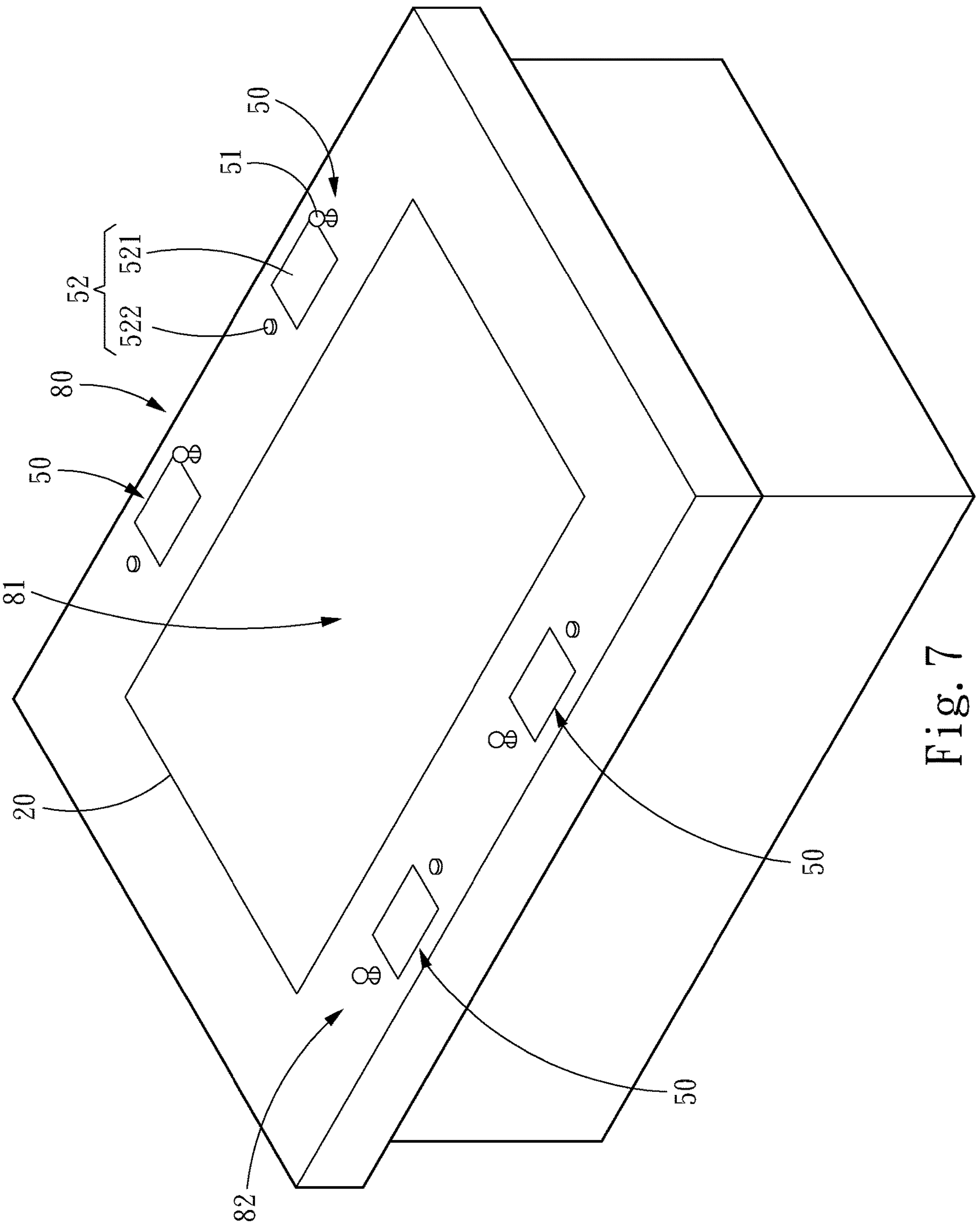
FIG. 7 is a schematic view of a game machine according to a third embodiment of the present invention.
Figure 8:
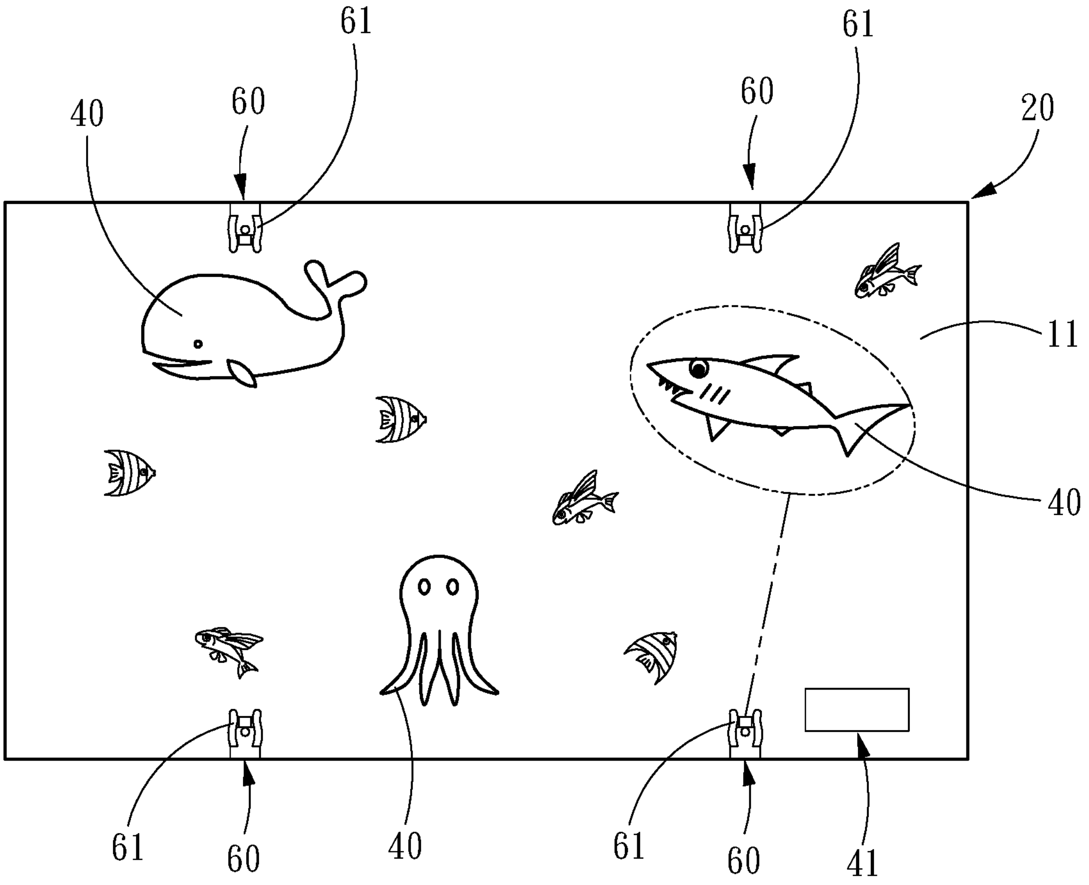
FIG. 8 is a schematic view of a game image according to a third embodiment of the present invention.

Referring to FIGS. 7 and 8, in the third embodiment, a table 80 is further provided, the table 80 includes a central area 81 and at least two shooting positions 82 surrounding the central area 81. The display unit 20 is disposed at the central area 81, and the control units 50 of the at least two player terminals P are disposed at the at least two shooting positions 82 in a one-to-one manner, respectively. That is, each of the shooting positions 82 is provided with one control unit 50 and provided for one of the players.

Each of the control units 50 includes a direction control element 51 and an input interface 52, and the input interface 52 includes a point button 521 and an action button 522, wherein the point button 521 is provided for changing a point of a game wager and can be a touch screen for displaying various points, and the action button 522 is provided as a firing switch of the shooting unit 60 for controlling the shooting unit 60 to fire a bullet. In one embodiment, the direction control element 51 is a rocker that allows the player to swing the rocker left and right to rotate the shooting direction of the shooting unit 60, or through which the player can perform a locking shooting or switch a locked target on the lockable target object 40, such as by swing the rocker down or otherwise operating to perform locking shooting or switch the locked target.

Alternatively, the shooting unit 60 includes a plurality of shooting apparatuses 61, and the player can switch via the control unit 50 to use any one of the plurality of shooting apparatuses 61 for attacking the lockable target object 40. The plurality of shooting apparatuses 61 may be various graphic styles of guns, launchers, etc. and are displayed on the game image 11. The player can freely select and switch the plurality of shooting apparatuses 61 to satisfy the player's preference when the locking shooting is performed. Further, the preview patterns 41 is displayed on the game image 11 corresponding to each of the shooting positions 82. While only one of the preview patterns 41 is displayed in FIG. 8, it indicates that only one player is playing the game. The display manner of the preview pattern 41 is described with reference to FIG. 3A or FIG. 3B and will not be repeated in this embodiment.

Figure 6:
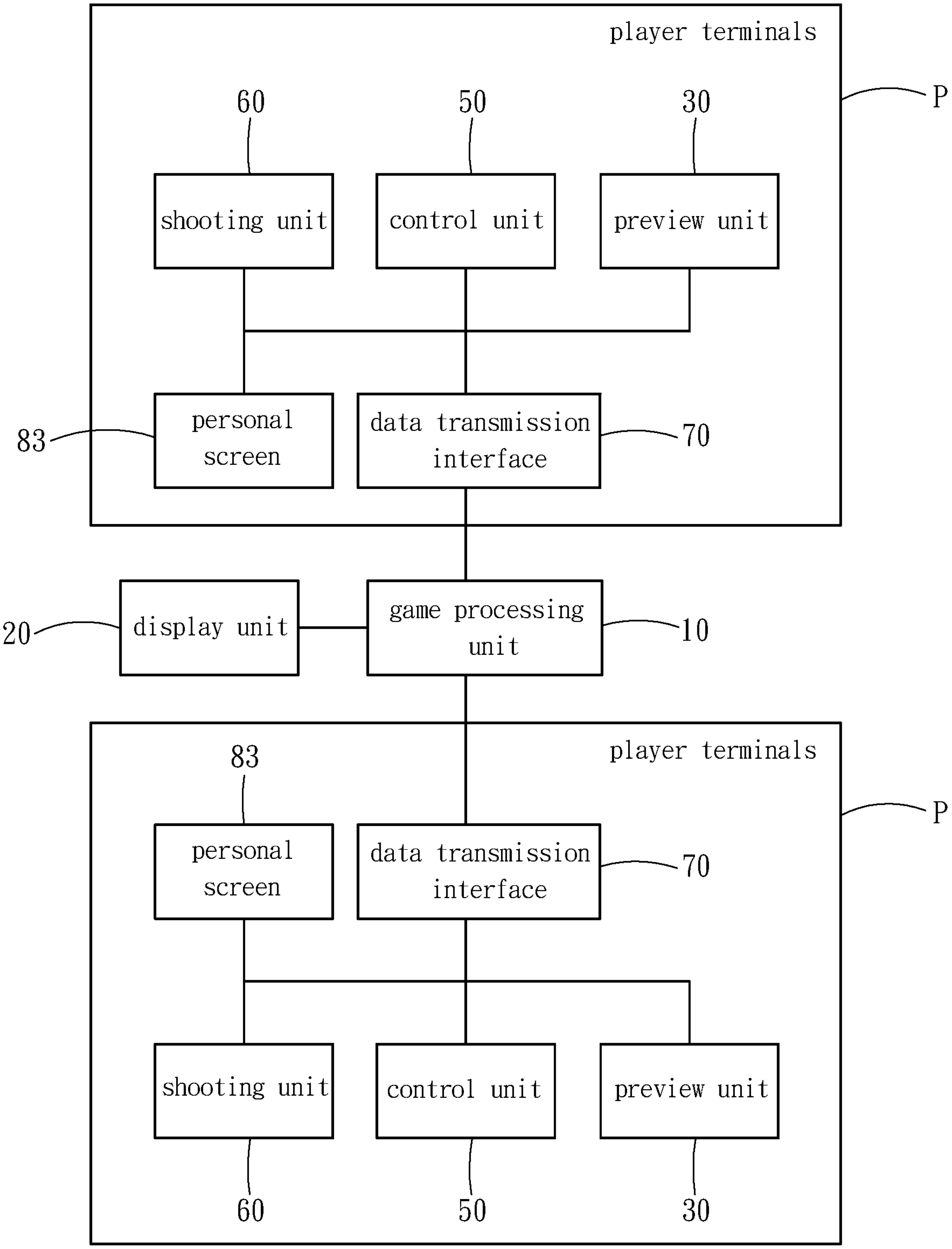
FIG. 6 is a block diagram of a system according to a third embodiment of the present invention.
Figure 9:
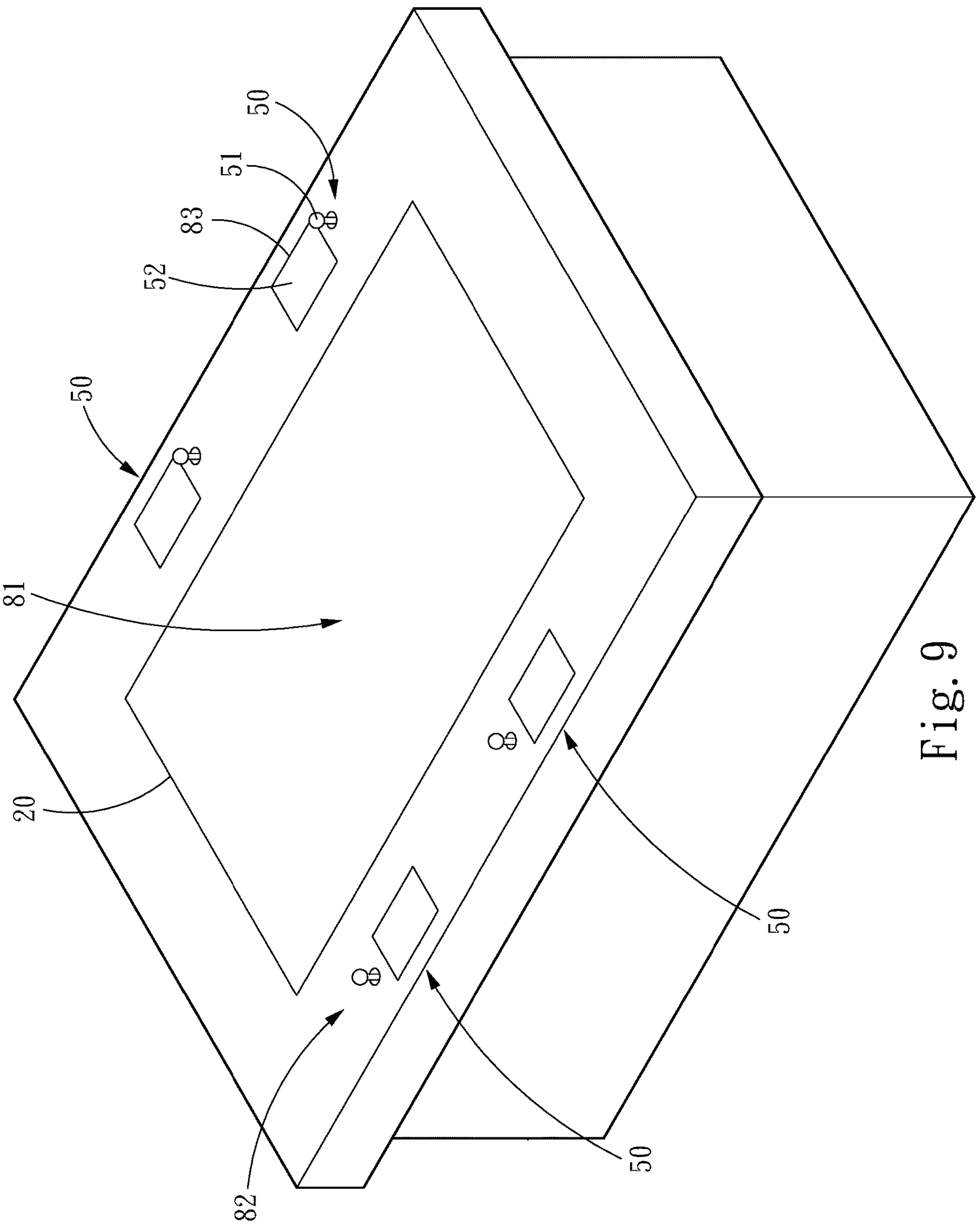
FIG. 9 is a schematic view of another game machine according to a third embodiment of the present invention.
Figure 10:
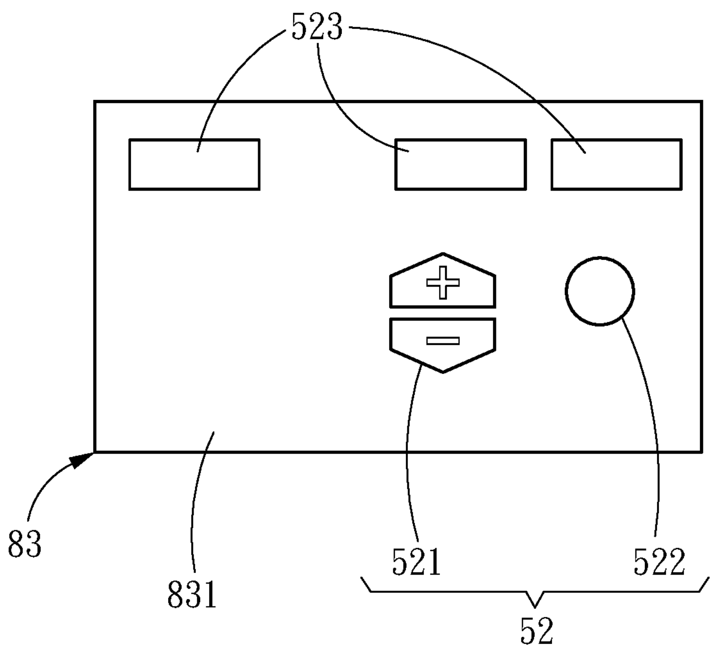
FIG. 10 is a schematic view of a touch screen of the present invention.

Referring to FIG. 6, FIG. 9 and FIG. 10, in another embodiment, each of the personal screens 83 is arranged corresponding to one of the player terminals P (one player), and the personal screen 83 presents a personal game screen 831 of the corresponding player, and the personal game screen 831 for displays a specific information according to the corresponding player. Each of the control units 50 includes a direction control element 51 and an input interface 52. In this embodiment, the personal screen 83 is a touch screen, and the personal screen 83 is integrated with the input interface 52. The personal screen 83 (touch screen) provides both input and display functions. That is, a point button 521 and an action button 522 are displayed on the personal screen 83 as the input interface 52, and a plurality of function buttons 523 are displayed to provide functions such as language selection, game rules specification, automatic launch, function switching, etc. Thus, while a game is playing, each player may use the touch screen as both the input interface 52 and the personal screen 83 in conjunction with the direction control element 51 to play the game.

Figure 11:
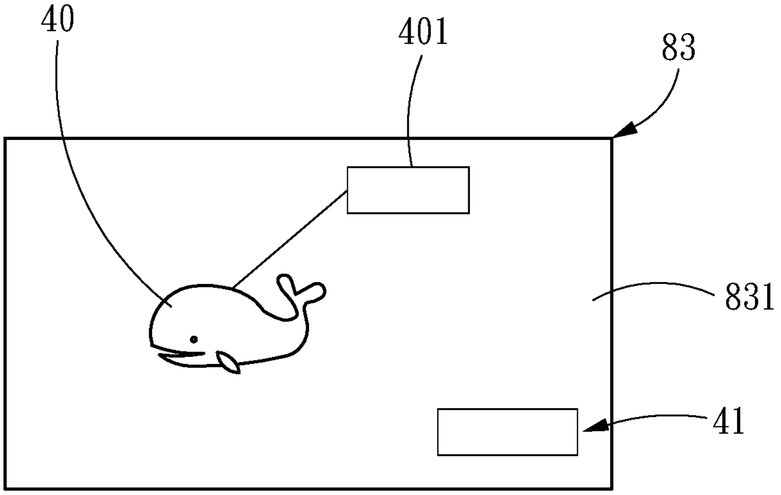
FIG. 11 is a schematic view of a personal game image of a personal screen of the present invention.

Referring to FIG. 11, the personal game screen 831 is a specific information which is displayed according to the corresponding player, and the specific information can be, but not limited to, the preview pattern 41, game instructions or instructional guidance, etc, such as the preview pattern 41 may be presented on the personal game screen 831. In addition, when a player needs a game instruction or an instructional guide, an information 401 of the lockable target object 40 can be displayed in the personal game screen 831 via the control of the control unit 50, and the information 401 includes a point of the lockable target object 40, a game instruction or an instructional guide, etc. In order to clearly display the information of the lockable target object 40, different information 401 of the lockable target object 40 can be displayed in turn.

Figure 12:
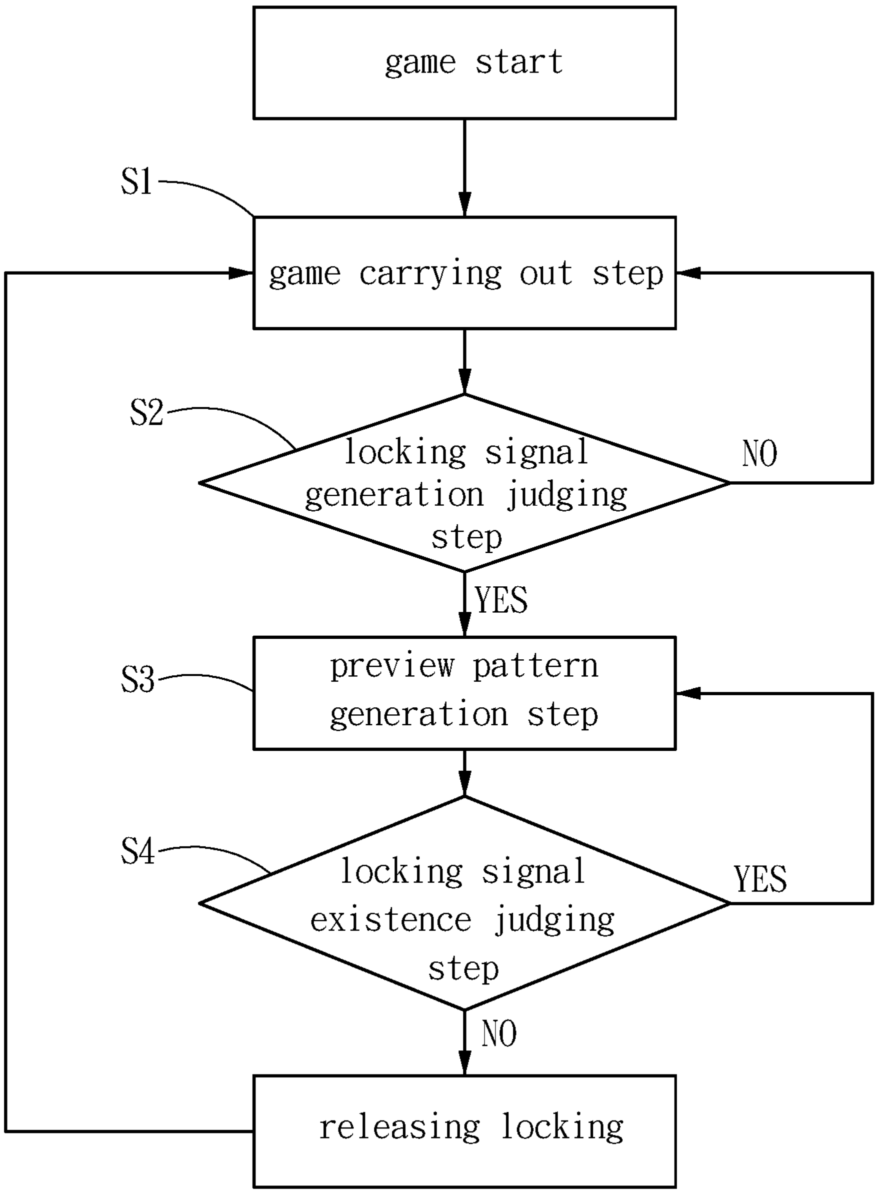
FIG. 12 is an operation flow chart of the present invention.

Referring to FIG. 12 which is an operation flow chart of the present invention, the present invention further provides a locking method for a shooting game device with a locking function, and the method includes: a game carrying out step S1, a locking signal generation judging step S2, a preview pattern generation step S3 and a locking signal existence judging step S4.

Referring to FIGS. 1 and 3A, the game carrying out step S1 provides a shooting game through a game processing unit 10 and generates a game image 11, the game image 11 is displayed by a display unit 20, and a control unit 50 generates or releases a locking signal by a player, respectively, to determine whether the game processing unit 10 locks at least one lockable target object 40. For example, the control unit 50 includes a direction control element 51 (as shown in FIG. 9), such as a rocker, that the player generates the locking signal by swinging down the direction control element 51; alternatively, the control unit 50 includes a function button 523 (as shown in FIG. 10), and the locking signal is generated by pressing the function button 523. In turn, the player controls a shooting unit 60 through the control unit 50 to attack the locked lockable target object 40.

The locking signal generation judging step S2 judges whether the locking signal is generated by the player or not. If so, the next step is carried out, namely the preview pattern generation step S3 is carried out; and if not, the method will return to the game carrying out step S1. The preview pattern generation step S3 generates a preview pattern 41 according to the at least one lockable target object 40 correspondingly through a preview unit 30 when the locking signal appears, wherein the preview pattern 41 includes at least one locking diagram 42 corresponding to the at least one lockable target object 40, and the preview unit 30 presents the preview pattern 41 on the game image 11 to be provided to the player, accordingly, the player switches and selects any one of the at least one locking diagram 42 through the control unit 50 to cause the game processing unit 10 to lock the corresponding lockable target object 40. The locking signal existence judging step S4 judges whether the locking signal is eliminated or not. If so, the preview unit 30 removes the preview pattern 41 provided to the corresponding player on the game image 11 and unlocks, and if not, the method returns to the preview pattern generation step S3.

In summary, the advantages of the present invention include at least:

1. The preview pattern is generated by the preview unit, the preview pattern includes the at least one locking diagram corresponding to the at least one lockable target object and is presented on the game image so that the player can preview all the lockable target objects.
2. The player can quickly switch and lock the desired lockable target object by using the control unit, and the use requirement is meet.
3. The preview pattern can be presented through the personal screen, so that interfering the game play by the preview pattern can be prevented.

What is claimed is:

1. A shooting game device with a locking function, comprising:

a table, comprising a central area and at least two shooting positions surrounding the central area;

a game processing unit, providing a shooting game and generating a game image;

a display unit, connected with the game processing unit and displaying the game image, and disposed at the central area;

at least two preview units, connected with the game processing unit, each of the at least two preview units arranged corresponding to a player, and generating a preview pattern according to at least one lockable target object, the preview pattern being corresponding to the at least one lockable target object and presented on the game image, and comprising at least one locking diagram corresponding to the at least one lockable target object;

at least two control units, connected with the game processing unit, each of the at least two control units arranged corresponding to the player, and provided for the player to switch and select any one of the at least one locking diagram so as to enable the game processing unit to lock the lockable target object which is selected; and at least two shooting units, connected with the game processing unit, each of the at least two shooting units being arranged corresponding to the player, and provided for the player to attack the lockable target object which is locked through operating the control unit; and at least two player terminals, each of the at least two player terminals comprising one of the at least two preview units, one of the at least two control units, one of the at least two shooting units and a data transmission interface, wherein the game processing unit is connected with the preview unit, the control unit and the shooting unit of each of the player terminal through the data transmission interface, respectively.

2. The shooting game device according to claim 1, wherein the shooting game device comprises at least one additional display unit, each of the at least two player terminals comprises one of the display units, and the game processing unit is connected with the display unit through the data transmission interface, respectively.

3. The shooting game device according to claim 1, wherein the at least two player terminals are respectively disposed at the at least two shooting positions in a one-to-one manner.

4. The shooting game device according to claim 1, wherein the locking diagram corresponding to the lockable target object that does not appear in the game image in the preview pattern is displayed in gray scale.

5. The shooting game device according to claim 1, wherein each of the at least two preview units generates the preview pattern according to the at least one lockable target object appearing in the game image correspondingly.

6. The shooting game device according to claim 1, wherein the at least one locking diagram in the preview pattern is ranked based on any one of random manner, player preferences, and corresponding scores.

7. The shooting game device according to claim 1, wherein each of the at least two control units comprises a direction control element and an input interface, and the input interface comprises a point button and an action button.

8. The shooting game device according to claim 5, wherein each of the at least two shooting unit comprises a plurality of shooting apparatuses, and the player utilizes the control unit to switch and use any one of the plurality of shooting apparatuses for attacking the lockable target object.

9. The shooting game device according to claim 1, wherein each of the at least two player terminals includes a personal screen, each of the personal screens is connected with the game processing unit and arranged corresponding to one of the at least two player terminals, the personal screen presents a personal game image of the player correspondingly, and the personal game image displays a specific information according to the player correspondingly.

10. The shooting game device according to claim 9, wherein the personal screen is a touch screen, the control unit includes a direction control element and an input interface, and the personal screen is integrated with the input interface.

11. The shooting game device according to claim 9, wherein the specific information includes the preview pattern.

12. A locking method for a shooting game device with a locking function, comprising:

a game carrying out step: providing a shooting game and generating a game image through a game processing unit, displaying the game image through a display unit which is disposed at a central area of a table of the shooting game device, enabling one of at least two control units surrounding the central area to respectively generate or release a locking signal by a player to determine whether the game processing unit locks any one of at least one lockable target object, and enabling the player to control one of at least two shooting units through the one of the at least two control units to attack the lockable target object which is locked;

a locking signal generation judging step: judging whether the player generates the locking signal or not, if so, carrying out the next step, and if not, returning to the game carrying out step;

a preview pattern generation step: when the locking signal appears, generating a preview pattern according to the at least one lockable target object through at least two preview units correspondingly, wherein the preview pattern comprises at least one locking diagram corresponding to the at least one lockable target object, and the at least two preview units present the preview pattern on the game image to be provided for the player; and a locking signal existence judging step, judging whether the locking signal is released or not, if so, removing the preview pattern on the game image provided to the player corresponded by the preview unit and releasing locking, and if not, returning to the preview pattern generation step.

13. The locking method according to claim 12, wherein each of the at least two control units includes a direction control element, and the locking signal is generated by pulling down the direction control element by the player.

14. The locking method according to claim 12, wherein each of the at least two control units includes a function button, and the locking signal is generated by pressing the function button by the player.

15. The locking method according to claim 12, wherein the locking diagram corresponding to the lockable target object that does not appear in the game image in the preview pattern is displayed in gray scale.

16. The locking method according to claim 12, wherein each of the at least two preview units generates the preview pattern according to and corresponding to the at least one lockable target object appearing in the game image.

* * * * *